US011549719B2

(12) United States Patent
Chan

(10) Patent No.: US 11,549,719 B2
(45) Date of Patent: Jan. 10, 2023

(54) DUCT PANEL

(71) Applicant: Instad Pre Fabrication Pte Ltd, Singapore (SG)

(72) Inventor: Kwan Heng Chan, Singapore (SG)

(73) Assignee: INSTAD PRE FABRICATION PTE LTD, Singapore (SG)

( * ) Notice: Subject to any disclaimer, the term of this patent is extended or adjusted under 35 U.S.C. 154(b) by 994 days.

(21) Appl. No.: 16/319,698

(22) PCT Filed: Jul. 25, 2017

(86) PCT No.: PCT/SG2017/050377
§ 371 (c)(1),
(2) Date: Jan. 22, 2019

(87) PCT Pub. No.: WO2018/021969
PCT Pub. Date: Feb. 1, 2018

(65) Prior Publication Data
US 2019/0353390 A1 Nov. 21, 2019

(30) Foreign Application Priority Data
Jul. 25, 2016 (SG) .......................... 10201606130V

(51) Int. Cl.
*F24F 13/02* (2006.01)
(52) U.S. Cl.
CPC ...... *F24F 13/0209* (2013.01); *F24F 13/0263* (2013.01); *F24F 13/0281* (2013.01)
(58) Field of Classification Search
CPC .............. F24F 13/0209; F24F 13/0263; F24F 13/0218
(Continued)

(56) References Cited

U.S. PATENT DOCUMENTS 3,844,078 A 10/1974 Fischer et al.
4,304,423 A * 12/1981 Mez .................. F16L 23/14
285/47
(Continued)

FOREIGN PATENT DOCUMENTS

CN 101509590 A 8/2009
CN 102330855 A 1/2012
(Continued)

OTHER PUBLICATIONS

International Search Report and Written Opinion for PCT/SG2017/050377 dated Aug. 29, 2017.
International Search Report and Written Opinion for Singapore Patent Application No. 10201606130V dated Oct. 10, 2016.
Written Opinion for Singapore Patent Application No. 10201606130V dated Nov. 16, 2017.
(Continued)

*Primary Examiner* — Craig M Schneider
*Assistant Examiner* — David R Deal
(74) *Attorney, Agent, or Firm* — Thomas | Horstemeyer, LLP

(57) ABSTRACT

A duct panel, a method of manufacturing a duct panel, a duct section and a method of installing a duct are disclosed. The duct panel includes a laminate structure having an insulation layer disposed between a first support layer and a second support layer, the laminate structure having an end width; and an end cap attached to the end width and configured to be coupled to a mounting flange, wherein the mounting flange is configured to mount the duct panel. The end cap and the mounting flange comprise different materials.

15 Claims, 5 Drawing Sheets

(58) Field of Classification Search
USPC .......................................................... 285/405
See application file for complete search history.

(56) References Cited

U.S. PATENT DOCUMENTS

| | | | | |
|---|---|---|---|---|
| 4,662,661 | A | * | 5/1987 | Arnoldt ............... F24F 13/0209 285/363 |
| 4,739,802 | A | * | 4/1988 | Meinig ................... F16L 23/14 138/109 |
| 5,103,872 | A | * | 4/1992 | Jyh-Long .............. F16B 5/0635 138/120 |
| 5,352,000 | A | | 10/1994 | Issagholian-Havai et al. |
| 5,358,013 | A | * | 10/1994 | McClain ................. F16L 23/14 138/109 |
| 5,653,482 | A | * | 8/1997 | Ficchi, Jr. ............... F16L 23/14 285/405 |
| 5,673,947 | A | * | 10/1997 | De Waal ............. F24F 13/0209 285/364 |
| 7,195,290 | B2 | * | 3/2007 | Duffy ...................... F16L 23/14 138/109 |
| 7,234,734 | B2 | * | 6/2007 | Borwig ............... F24F 13/0209 285/424 |
| 7,651,390 | B1 | | 1/2010 | Profeta et al. |
| 8,107,238 | B2 | | 1/2012 | Krietzman et al. |
| 10,533,689 | B2 | * | 1/2020 | Plantz, Jr. ............. F16L 39/005 |
| 2004/0250596 | A1 | * | 12/2004 | Hermanson ......... F24F 13/0209 72/370.26 |
| 2021/0302058 | A1 | * | 9/2021 | Duffy ................. F24F 13/0281 |

FOREIGN PATENT DOCUMENTS

| | | | |
|---|---|---|---|
| CN | 104534207 | A | 4/2015 |
| GB | 2051216 | A | 1/1981 |
| GB | 2517476 | A | 2/2015 |
| WO | 2018/021969 | A1 | 7/2017 |

OTHER PUBLICATIONS

Examination Report for Singapore Patent Application No. 10201606130V dated Nov. 9, 2018.
Notice of Eligibility for Grant for Singapore Patent Application No. 10201606130V dated Nov. 9, 2018.
Australian Exam Report No. 1 in Australian App. No. 2017302396, dated Mar. 18, 2022.
Chinese Office Action in CN Application No. 2017800572214, dated Jul. 22, 2020.
European Exam Report in EP 17834872.8, dated Dec. 14, 2020.
European Supplemental Search Report in EP 17834872.8, dated Jan. 29, 2020.
Indonesian Office Action in ID App. PID201901473, dated Feb. 15, 2021 (with English Translation).
Indian FER Report in IN App. No. 201917006571, dated Apr. 19, 2021.
Korean Office Action in KR 9-5-2020033841692, dated May 18, 2020 (with English Translation).
Malaysian Office Action for MY App. PI2019000367, dated Jul. 25, 2017.
Phillipines Office Action in PH App. No. 1/2019/500174, dated Jan. 24, 2019.
Russian Office Action in RU 2019104701/03, dated Jul. 25, 2017 (and English Translation).
Singapore Examination Report in SG10201606130V, dated Jul. 25, 2016.
Taiwan Office Action in TW Application No. 106124974, dated Aug. 3, 2021 (and English Translation).
Taiwan Search Report TW Application No. 106124974, dated Aug. 26, 2021.
Taiwan Office Action in TW Application No. 106124974, dated Nov. 30, 2019 (and English Translation).
Taiwan Search Report TW Application No. 106124974, dated Dec. 2, 2020.

* cited by examiner

DUCT PANEL

CROSS REFERENCE TO RELATED APPLICATIONS

This application is the 35 U.S.C. § 371 national stage application of PCT Application No. PCT/SG2017/050377, filed Jul. 25, 2017, where the PCT claims priority to and the benefit of SG Patent Application No. 10201606130V, filed Jul. 25, 2016, all of which are herein incorporated by reference in their entireties.

TECHNICAL FIELD

The present invention relates broadly to a duct panel, a method of manufacturing the same, a duct section and a method of installing a duct.

BACKGROUND

Air ducts are used in conjunction with a heating, ventilation and air conditioning (HVAC) system of a building to deliver and remove air. An air duct typically comprises multiple short sections that are assembled together. Depending on the requirements and the building regulations, different sizes and types of air ducts can be installed in the building.

Conventionally, the air duct is installed on site, as part of the site construction works. For example, metal sheets are bent into a metal duct and an insulation layer is subsequently disposed around the metal duct. The installation work is typically carried out manually. The quality of the air duct may vary, depending on the workmanship. The wastage of materials may increase and the insulation performance may also be compromised.

Also, most of the air ducts are at ceiling level, thus the installation work has to be carried out at an elevated height. This may pose danger to the workers and cause low productivity in the installation work. In an existing solution, the air duct may be fabricated in a fabrication workshop off-site before being transported to the site. However, the air ducts are mostly bulky. Thus, it may be difficult and cumbersome to transport the air ducts to the site. Furthermore, the air ducts are awkward to handle and require large storage areas.

A need therefore exists to provide a duct panel that seeks to address at least some of the problems above or to provide a useful alternative.

SUMMARY

According to a first aspect of the present invention, there is provided a duct panel comprising:

a laminate structure having an insulation layer disposed between a first support layer and a second support layer, the laminate structure having an end width; and an end cap attached to the end width and configured to be coupled to a mounting flange, wherein the mounting flange is configured to mount the duct panel, wherein the end cap comprises a plastic material and the mounting flange comprises a metal, and wherein the mounting flange and the second support layer form a unitary construction.

The insulation layer may comprise polyisocyanurate (PIR).

The plastic material may be polyvinyl chloride (PVC).

The first support layer may be configured to form an internal surface of a duct and may comprise a material selected from a group consisting of galvanised steel, aluminium and stainless steel.

The second support layer may be configured to form an external surface of the duct may comprise a material selected from a group consisting of galvanised steel, aluminium and stainless steel.

The mounting flange may extend outwardly relative to the second support layer.

The end cap may comprise a locking member, wherein the locking member is configured to engage with a corresponding locking member of the mounting flange.

According to a second aspect of the present invention, there is provided a duct section comprising a plurality of duct panels as defined in the first aspect, the duct panels forming an enclosed cross-section.

Adjacent duct panels may be attached to each other along a length-wise direction of each panel using a locking mechanism.

According to a third aspect of the present invention, there is provided a method of manufacturing a duct panel, the method comprising the steps of:

disposing an insulation layer between a first support layer and a second support layer to form a laminate structure, the laminate structure having an end width;

attaching an end cap to the end width; and coupling a mounting flange to the end cap, wherein the end cap is made of a plastic material and the mounting flange is made of a metal, and wherein the mounting flange and the second support layer form a unitary construction.

The insulation layer may be made of polyisocyanurate (PIR).

The plastic material may be polyvinyl chloride (PVC).

The first support layer may be made of a material selected from a group consisting of galvanised steel, aluminium and stainless steel.

The second support layer may be made of a material selected from a group consisting of galvanised steel, aluminium and stainless steel.

According to a fourth aspect of the present invention, there is provided a method of installing a duct, the method comprising:

assembling a plurality of duct panels as defined in the first aspect to form a duct section; and mounting the duct section to at least one adjacent duct section using the respective mounting flanges.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1A:
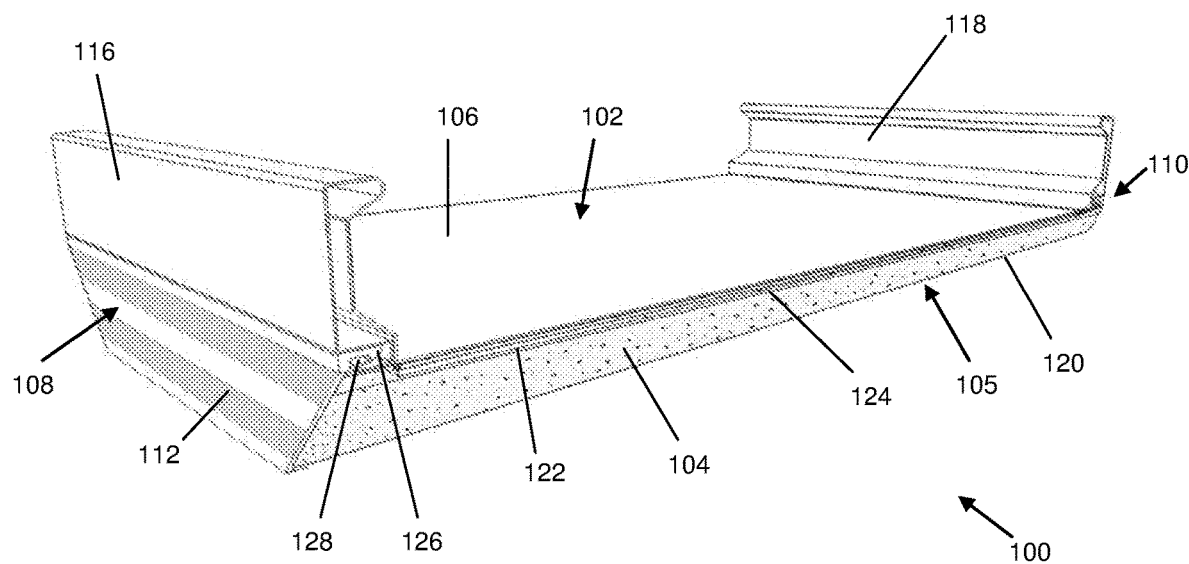
FIG. 1A shows a schematic diagram illustrating a view of a duct panel according to an example embodiment.
Figure 1B:
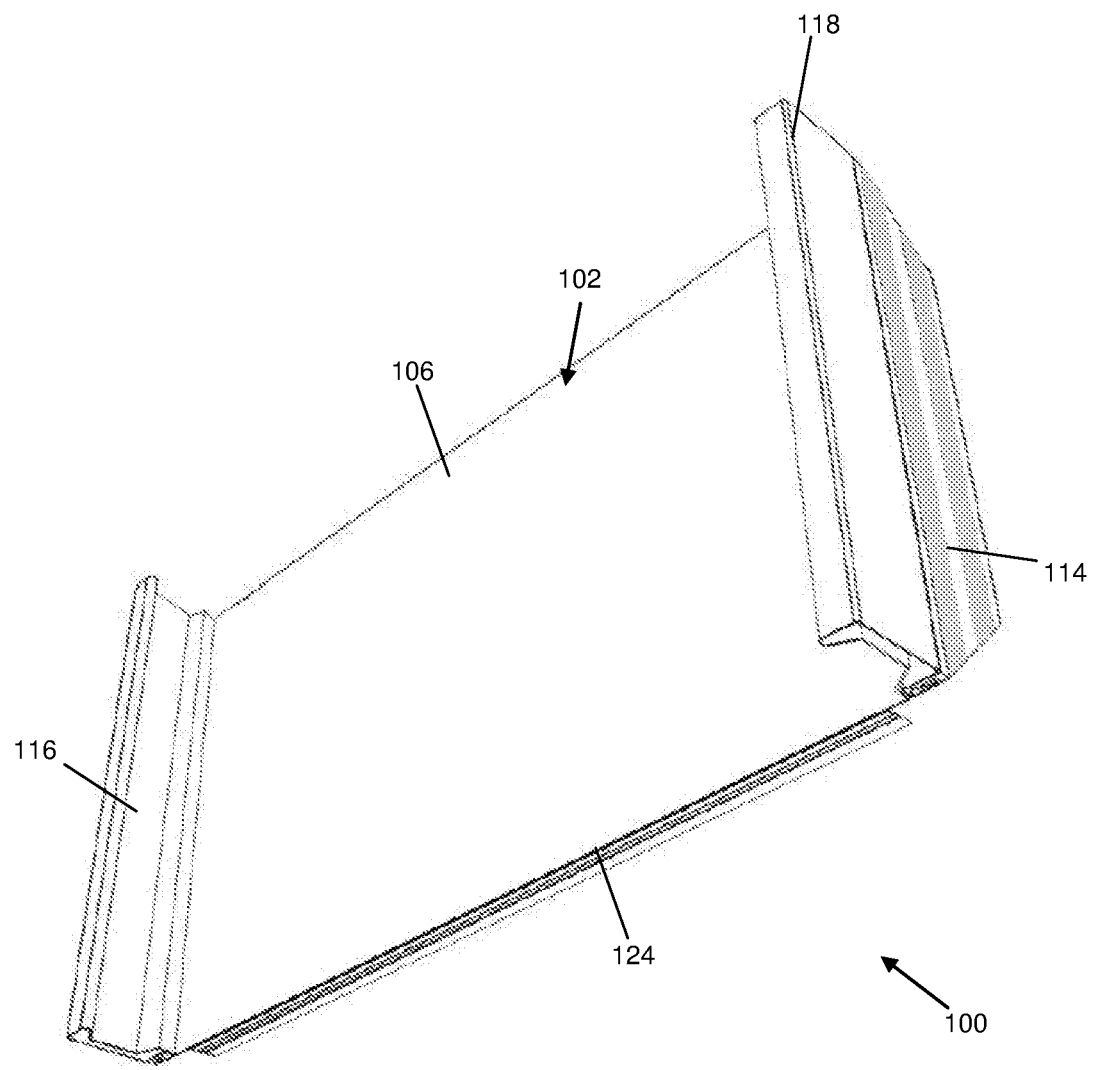
FIG. 1B show a schematic diagram illustrating another view of the duct panel of FIG. 1A.

FIGS. 1A and 1B show schematic diagrams illustrating a duct panel 100 according to an example embodiment. The duct panel 100 comprises a laminate structure 102 having an insulation layer 104 disposed between a first support layer 105, represented as first metal layer 105, and a second support layer 106, represented as second metal layer 106. The laminate structure 102 has at least one end width, represented in FIGS. 1A and 1B as first end width 108, and second end width 110. A first end cap 112 is attached to the first end width 108 and a second end cap 114 is attached to the second end width 110. The first end cap 112 and the second end cap 114 are configured to be coupled to a first mounting flange 116 and a second mounting flange 118 respectively. The first and second end caps 112, 114 comprise different materials from the first and second mounting flanges 116, 118. The first mounting flange 116 and second mounting flange 118 are configured to mount the duct panel 100 to an external structure (not shown), e.g. a mounting flange of an adjacent duct section.

The insulation layer 104 in the example embodiment is a thin rectangular layer and has a first surface 120 and second surface 122. The first surface 120 is attached to the first metal layer 105 and the second surface 122 is attached to the second metal layer 106 to form the laminate structure 102. The insulation layer 104 has two substantially parallel length sides. Each length side abuts a corresponding length side of an adjacent insulation layer (not shown) when two duct panels are assembled together. The length sides may have different surface structures along the thickness of the insulation layer 104, e.g. serrated or sloped, which correspond to a surface structure of the corresponding length side. The surface structures may increase the contact between the abutting length sides, to enhance the abutment. The abutment of the length sides of the respective duct panels may further be enhanced by using an adhesive means, e.g. glue. It will be appreciated by a person skilled in the art that the insulation layer 104 may be of other shapes, e.g. triangular, etc., which may be used for linking two adjacent duct panels with the end width being disposed perpendicularly to each other.

In an embodiment of the present invention, the insulation layer 104 is made of polyisocyanurate (PIR). PIR may be a suitable material because it has relatively high thermal resistance, high R-value (R6 per inch) and low K-factor (0.023 w/m-k). It will be appreciated by a person skilled in the art that the insulation layer 104 may be made of other materials and PIR is one of the examples.

Typically, the insulation layer 104 which is made of PIR has a thickness between 20-40 mm. In general, the thickness of the insulation layer 104 increases with the width of the duct panel 100, since a wider duct panels are typically used for ducts which supply air with a higher flow rate, which in turn require better insulation. In an embodiment, the density of the PIR insulation layer 104 is about 50 kg/m$^3$±2 kg/m$^3$. The insulation layer 104 is usually made in standard lengths, e.g. less than 2 metres. This may simplify the manufacturing process of the duct panel 100. It will be appreciated by a person skilled in the art that the thickness and density of the insulation layer 104, as well as the length may vary in different embodiments, depending on e.g. the desired insulation performance, ease of transportation or storage and where the duct panel will be installed.

Typically, the first metal layer 105 is made of galvanized steel, aluminium or stainless steel. Similarly, the second metal layer 106 can be made of galvanized steel, aluminium or stainless steel. These materials are substantially durable and thus the metal layers 105, 106 are typically reasonably thin, e.g. thickness of less than 1 mm. These metal layers 105, 106 may advantageously provide a more rigid structure supporting the insulation layer 104 as compared to the conventional duct which uses aluminium foil. Additionally, the surface of the metal layers 105, 106 may be anti-corrosive. The surface may also be treated, for example painted, to further enhance the anti-corrosive properties or the aesthetic of the duct. In use, the first metal layer 105 forms an internal surface of the duct and the second metal layer 106 forms an external surface of the duct. It will be appreciated by a person skilled in the art that the first metal layer 105 and second metal layer 106 may be made of different materials, depending on e.g. costs and building regulations. Further, it will also be appreciated that the first support layer and second support layer may be made of non-metal materials, e.g. composite or plastic, that have comparable thermal and structural properties and the materials provided above are only some of the examples.

It is also shown in FIGS. 1A and 1B that the second metal layer 106 includes a locking mechanism in the form of a snap-lock member 124. This snap-lock member 124 is configured to interlock with a corresponding snap-lock member of another duct panel when two adjacent duct panels are assembled together. The interlock between the snap-lock members of adjacent duct panels may allow the assembly work to be easier and a tighter assembly between adjacent duct panels. In another embodiment, the snap-lock member 124 may be disposed on the first metal layer 105 or on both the first metal layer 105 and the second metal layer 106.

In the example shown in FIGS. 1A and 1B, the first end cap 112 and the second end cap 114 are attached to the first end width 108 and the second end width 110 of the laminate structure 102 respectively. Specifically, the end caps 112, 114 grip the laminate structure 102 at the first metal layer 105 and the second metal layer 106.

Each of the lateral sides of the end caps 112, 114 are typically structured to flush with the length sides of the insulation layer. For example, in FIG. 1B, both the lateral sides of the end caps 112, 114 are sloped to correspond to the surface structure of the length sides which have a sloped configuration. In an embodiment, the end caps 112, 114 have a textured surface, e.g. saw-toothed surface. Glue may be applied to the textured surface before attaching the textured surface to the first end width 108. The textured surface may advantageously provide a more secure attachment.

As shown in FIGS. 1A and 1B, the first mounting flange 116 and the second mounting flange 118 form a unitary construction with the second metal layer 106. For example, the mounting flanges 116, 118 and the second metal layer 106 may be bent from a single metal sheet. It will be appreciated by a person skilled in the art that other manufacturing processes may also be used to form the unitary construction, for example aluminium extrusion. In another embodiment, the first mounting flange 114 and the second mounting flange 116 are configured to be removably attached to the second metal layer 106. In other words, the mounting flanges 116, 118 and the second metal layer 106 are all independent structures. In both cases, holes are usually made through the flange for mounting the duct panel 100. The mounting flanges 116, 118 are normally made of materials that are substantially ductile, e.g. metal.

In FIGS. 1A and 1B, the first end cap 112 has a locking member 126 that engages with a corresponding locking member 128 of the first mounting flange 116, the locking members 126, 128 interlock adjacent the second metal layer 106. The second end cap 114 also engages with the second mounting flange 118 in the same configurations. As a result, the first mounting flange 116 and the second mounting flange 118 extend outwardly in relative to the second metal layer 106. It will be appreciated by a person skilled in the art that the end caps 112, 114 may engage with the respective mounting flanges 116, 118 in other configurations. For example, the mounting flanges 116, 118 may be fastened to the end caps 112, 114 using a fastener, such as a screw.

In use, the portion of the end caps 112, 114 adjacent the first metal layer 105 is exposed to the air flowing in the duct. The air flowing in the duct is often at a different temperature from the air outside of the duct. To reduce heat transfer through the end caps 112, 114 and to prevent a potential thermal bridge in the duct panel 100, the end caps 112, 114 are typically made of material with high thermal resistance, e.g. a plastic material such as polyvinyl chloride (PVC). This may advantageously reduce unwanted heat gain or loss in the air flowing in the duct. It will be appreciated by a person skilled in the art that the end caps 112, 114 may be made of other materials with suitable heat resistance and PVC is one of the examples.

Figure 2:
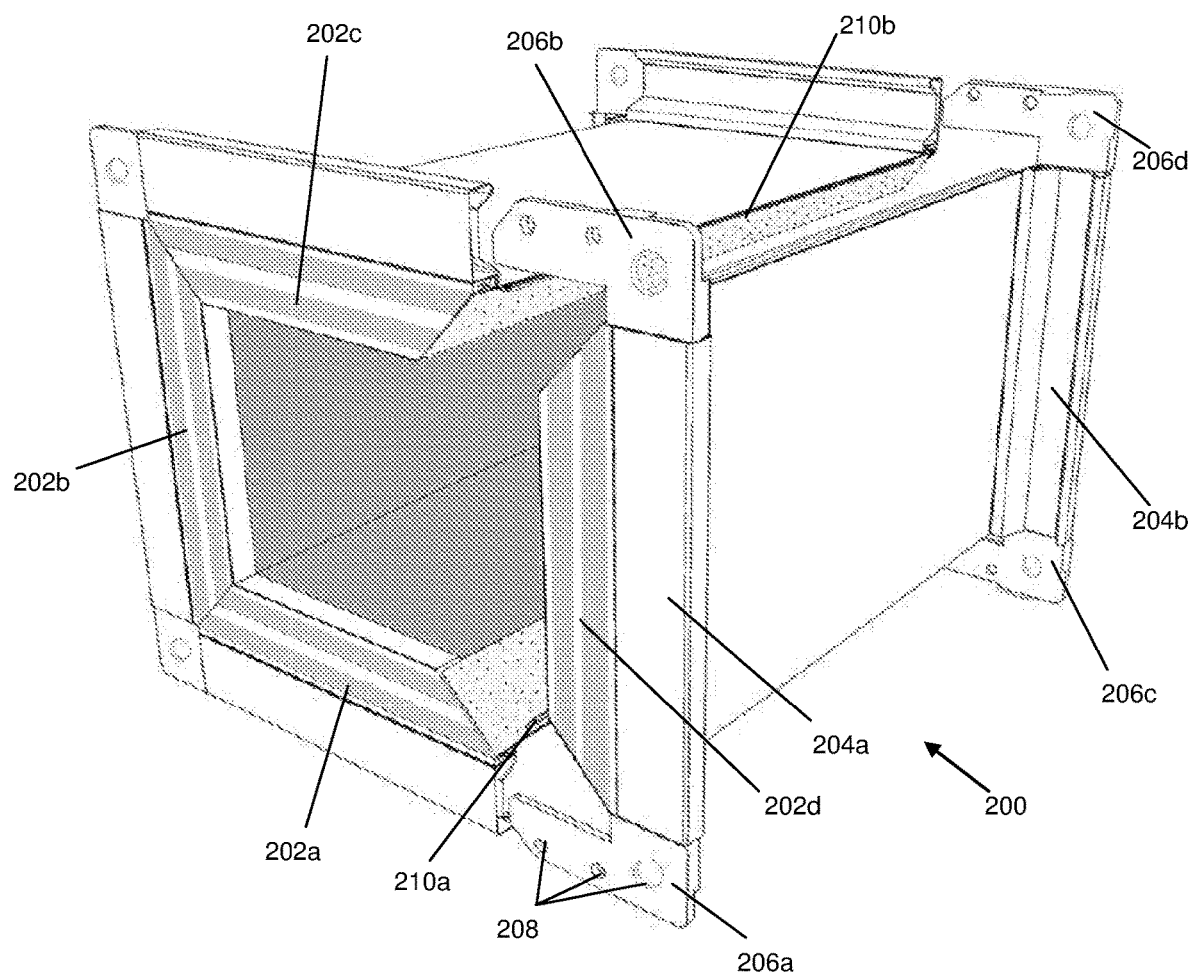
FIG. 2 shows a schematic diagram illustrating a four-sided duct section having four duct panels of FIGS. 1A and 1B.

FIG. 2 shows a schematic diagram illustrating a four-sided duct section 200 having four duct panels 202a, 202b, 202c, 202d of FIGS. 1A and 1B. It is shown that a first duct panel 202a, a second duct panel 202b and a third duct panel 202c have been assembled together, forming three sides of the duct section 200 with a "C" shaped structure. A fourth duct panel 202d is being assembled into the "C" shaped structure. As explained above in respect to FIGS. 1A and 1B, the assembly of two adjacent duct panels causes the corresponding length sides of the insulation layers in the duct panels to abut each other. In this example, the length sides of the insulation layer in the fourth duct panel 202d are abutting the corresponding length sides of the insulation layers in the first duct panel 202a and the third duct panel 202c.

The fourth duct panel 202d has a first mounting flange 204a and a second mounting flange 204b. A first corner piece 206a, a second corner piece 206b, a third corner piece 206c and a fourth corner piece 206d are inserted into each side of the first and second mounting flanges 204a, 204b respectively. The corner pieces 206a, 206b, 206c, 206d may be in different configurations, e.g. a single L-shaped piece or a combination of 2 I-shaped pieces. The corner pieces 206a, 206b, 206c, 206d may have through-holes 208 for insertion of fasteners (not shown), e.g. screw and bolt. The corner pieces 206a, 206b, 206c, 206d are subsequently inserted into the corresponding mounting flanges of the first duct panel 202a and the third duct panel 202c. Fasteners may be inserted into the through-holes 208 for affixing the corner pieces 206a, 206b, 206c, 206d to the respective mounting flanges 202a, 202c, 202d or, as described with respect to FIG. 4 below, for affixing the duct section 200 to an adjacent external structure (not shown), e.g. an adjacent duct section. The snap-lock members, e.g. 210a, 210b, of the metal layers in each of the duct panels 202a, 202c, 202d may also interlock with the corresponding snap-lock members in the adjacent duct panels 202a, 202c, 202d.

Figure 3:
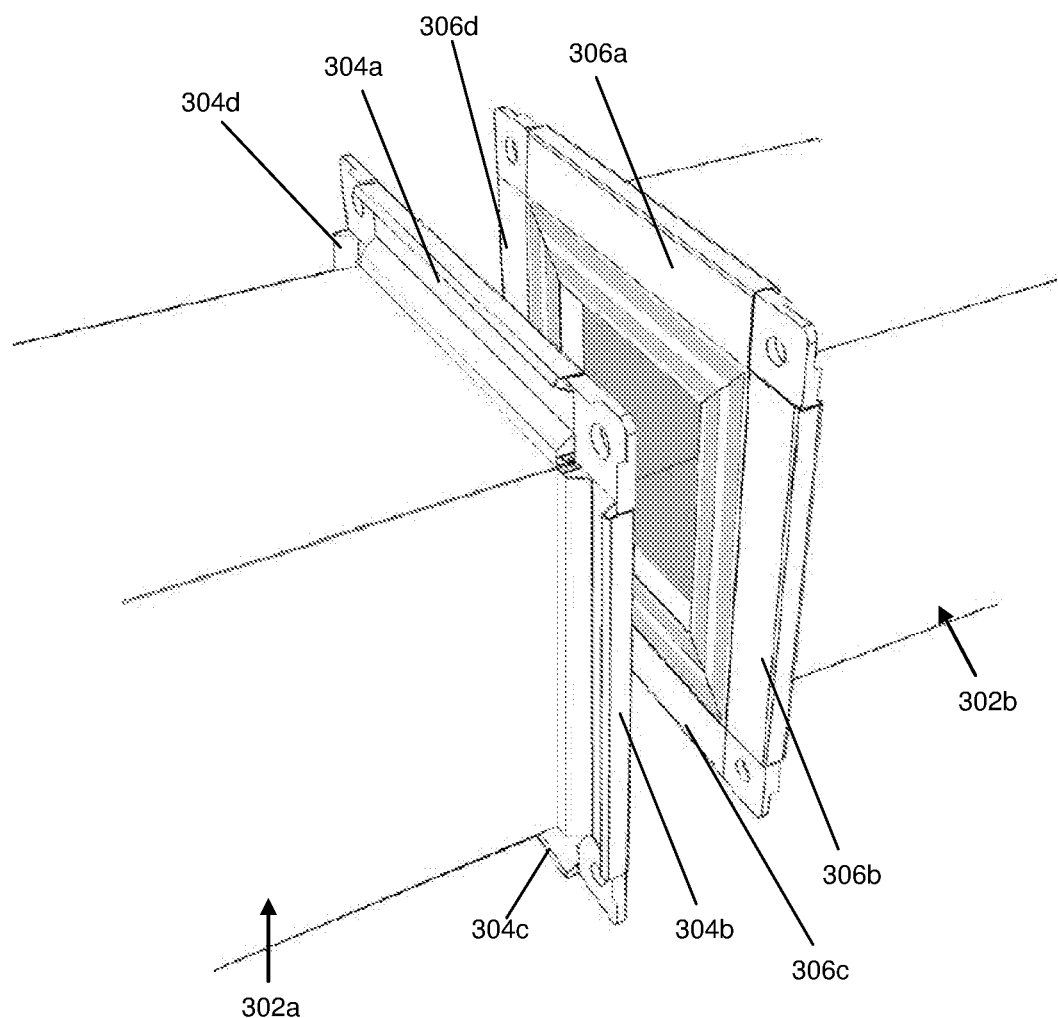
FIG. 3 shows a schematic diagram illustrating two adjacent four-sided duct sections being assembled together to form a duct according to an example embodiment.

FIG. 3 shows a schematic diagram illustrating two adjacent four-sided duct sections 302a, 302b being assembled together to form a duct. It is shown that a first duct section 302a is being attached to a second duct section 302b. Each of the duct sections 302a, 302b has four mounting flanges that extend outwardly. Typically, a seal with suitable thermal resistance may be disposed between the mounting flanges 304a, 304b, 304c, 304d of the first duct section 302a and the mounting flanges 306a, 306b, 306c, 306d of the second duct section 302b, to make the connection between the mounting flanges 304a, 304b, 304c, 304d of the first duct section 302a and the mounting flanges 306a, 306b, 306c, 306d of the second duct section 302b substantially fluid-tight.

Figure 4:
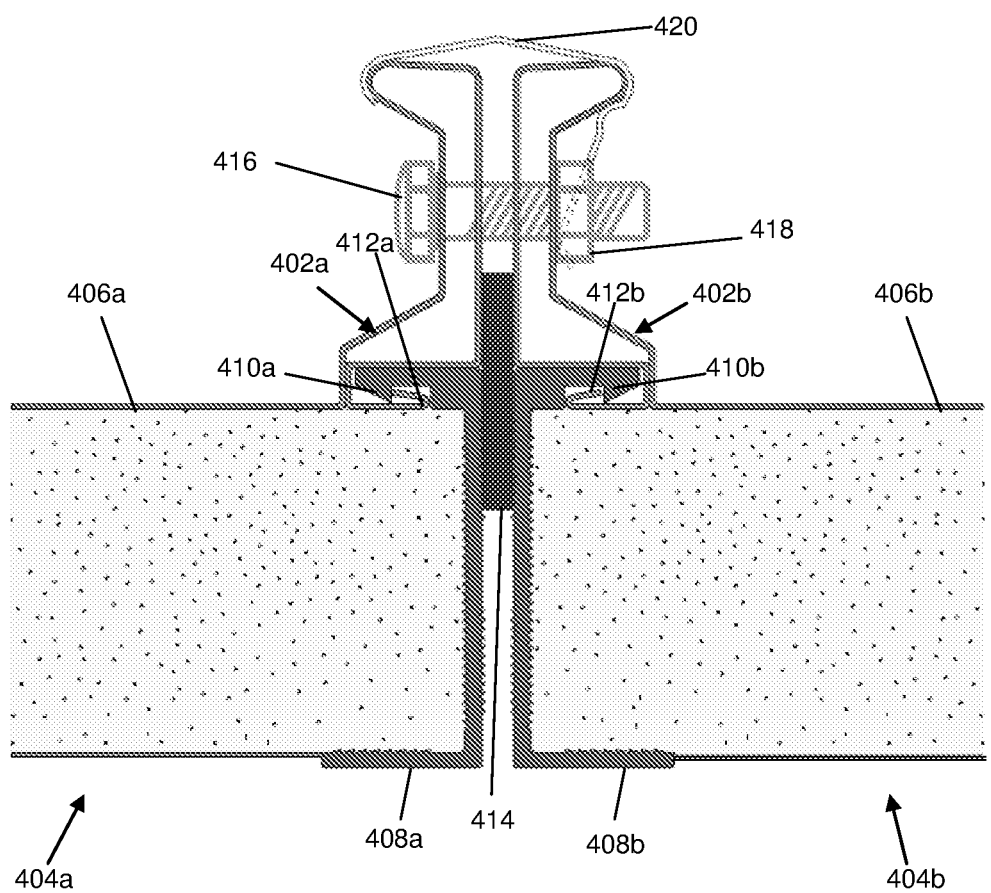
FIG. 4 shows a schematic diagram illustrating an enlarged view of an assembly of two adjacent mounting flanges according to an example embodiment.

FIG. 4 shows a schematic diagram illustrating an enlarged view of an example assembly of two adjacent mounting flanges 402a, 402b. It is shown that a first mounting flange 402a and a second mounting flange 402b are mounted to a first duct panel 404a and a second duct panel 404b respectively. In this embodiment, the first mounting flange 402a and the second mounting flange 402b form unitary construction with a first metal layer 406a and a second metal layer 406b respectively. Further, each duct panels 404a, 404b has an end cap 408a, 408b, which is attached to an end width of the duct panels 404a, 404b. Each of the end caps 408a, 408b has a locking member 410a, 410b that engages with a corresponding locking member 412a, 412b of the mounting flanges 402a, 402b.

A seal 414 can be seen being disposed between the first and second duct panels 404a, 404b. The first mounting flange 402a is mounted to the second mounting flange 402b using a screw 416 and a nut 418. A snap-fit member 420 can also be used to press the mounting flanges 402a, 402b together to further strengthen the mounting and prevent accumulation of water or dirt if the duct is installed outdoors. It will be appreciated by a person skilled in the art that other fasteners may be used to mount the adjacent mounting flanges 402a, 402b, and using screws and nuts are only one of the examples. In addition, it will be appreciated that the assembly between the adjacent mounting flanges 402a, 402b may include other structural components, e.g. an enforcement member within the flange to prevent breaking of the mounting flanges 402a, 402b.

Comparing the duct panel 100 of the example embodiments with a conventional duct panel, the duct panel 100 of the example embodiments may allow a more efficient energy use in the HVAC system. Specifically, the energy loss or gain may reduce as a result of better insulation in the duct. For example, the duct panel 100 has the PVC end caps 112, 114 which may reduce heat transfer through the end caps. This may also prevent thermal bridge in the duct panel, and thus the duct.

The duct panels of the example embodiments are manufactured off-site and transported to site in the panel form which is relatively compact. The duct panels can be assembled together on-site using snap-fit engagement to form a duct section. For example, the end caps 112, 114 are coupled to the mounting flanges 116, 118 using locking members. Additional insulation to the duct may not be required. This may substantially reduce duct insulation work and the noise level generated on-site. Also, the duct may advantageously be lighter and stronger than the conventional duct. Other advantages of the duct panel may include less waste due to reduced manual insulation work, increased productivity on-site, environmentally-friendly product due to formaldehyde free materials being used.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:
1. A duct panel comprising:
   a laminate structure having an insulation layer disposed between a first support layer and a second support layer, the laminate structure having an end width; and an end cap attached to the end width and configured to be coupled to a mounting flange, wherein the mounting flange is configured to mount the duct panel, wherein the end cap comprises a plastic material and the mounting flange comprises a metal, and wherein the mounting flange and the second support layer form a unitary construction.

2. The duct panel as claimed in claim 1, wherein the insulation layer comprises polyisocyanurate (PIR).

3. The duct panel as claimed in claim 1, wherein the plastic material is polyvinyl chloride (PVC).

4. The duct panel as claimed in claim 1, wherein the first support layer is configured to form an internal surface of a duct, the first support layer comprising a material selected from a group consisting of galvanised steel, aluminium and stainless steel.

5. The duct panel as claimed in claim 4, wherein the second support layer is configured to form an external surface of the duct, the second support layer comprising a material selected from a group consisting of galvanised steel, aluminium and stainless steel.

6. The duct panel as claimed in claim 5, wherein the mounting flange extends outwardly relative to the second support layer.

7. The duct panel as claimed in claim 1, wherein the end cap comprises a locking member, wherein the locking member is configured to engage with a corresponding locking member of the mounting flange.

8. A duct section comprising a plurality of duct panels as claimed in claim 1, the duct panels forming an enclosed cross-section.

9. The duct section as claimed in claim 8, wherein adjacent duct panels are attached to each other along a length-wise direction of each panel using a locking mechanism.

10. A method of installing a duct, the method comprising:
assembling a plurality of duct panels as claimed in claim 1 to form a duct section; and
mounting the duct section to at least one adjacent duct section using the respective mounting flanges.

11. A method of manufacturing a duct panel, the method comprising the steps of:
disposing an insulation layer between a first support layer and a second support layer to form a laminate structure, the laminate structure having an end width;
attaching an end cap to the end width; and
coupling a mounting flange to the end cap,
wherein the end cap is made of a plastic material and the mounting flange is made of a metal, and
wherein the mounting flange and the second support layer form a unitary construction.

12. The method as claimed in claim 11, wherein the insulation layer is made of polyisocyanurate (PIR).

13. The method as claimed in claim 11, wherein the plastic material is polyvinyl chloride (PVC).

14. The method as claimed in claim 11, wherein the first support layer is made of a material selected from a group consisting of galvanised steel, aluminium and stainless steel.

15. The method as claimed in claim 11, wherein the second support layer is made of a material selected from a group consisting of galvanised steel, aluminium and stainless steel.

* * * * *